May 26, 1936.  E. WATSON  2,042,243
METHOD AND MACHINE FOR MAKING DIAGONALLY CORRUGATED BOARD
Filed Sept. 19, 1931   2 Sheets-Sheet 1
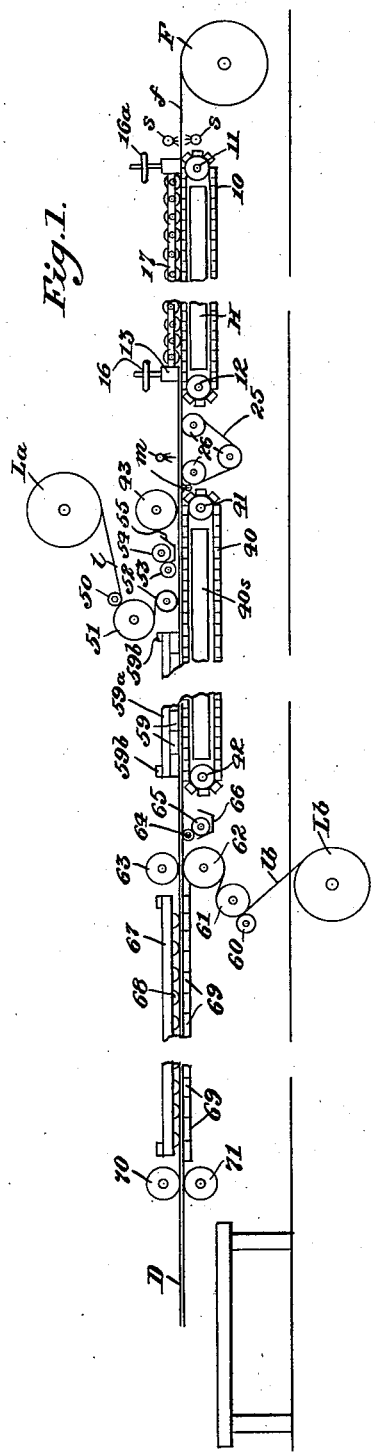
Inventor:
Edgar Watson,
by
Att'ys.

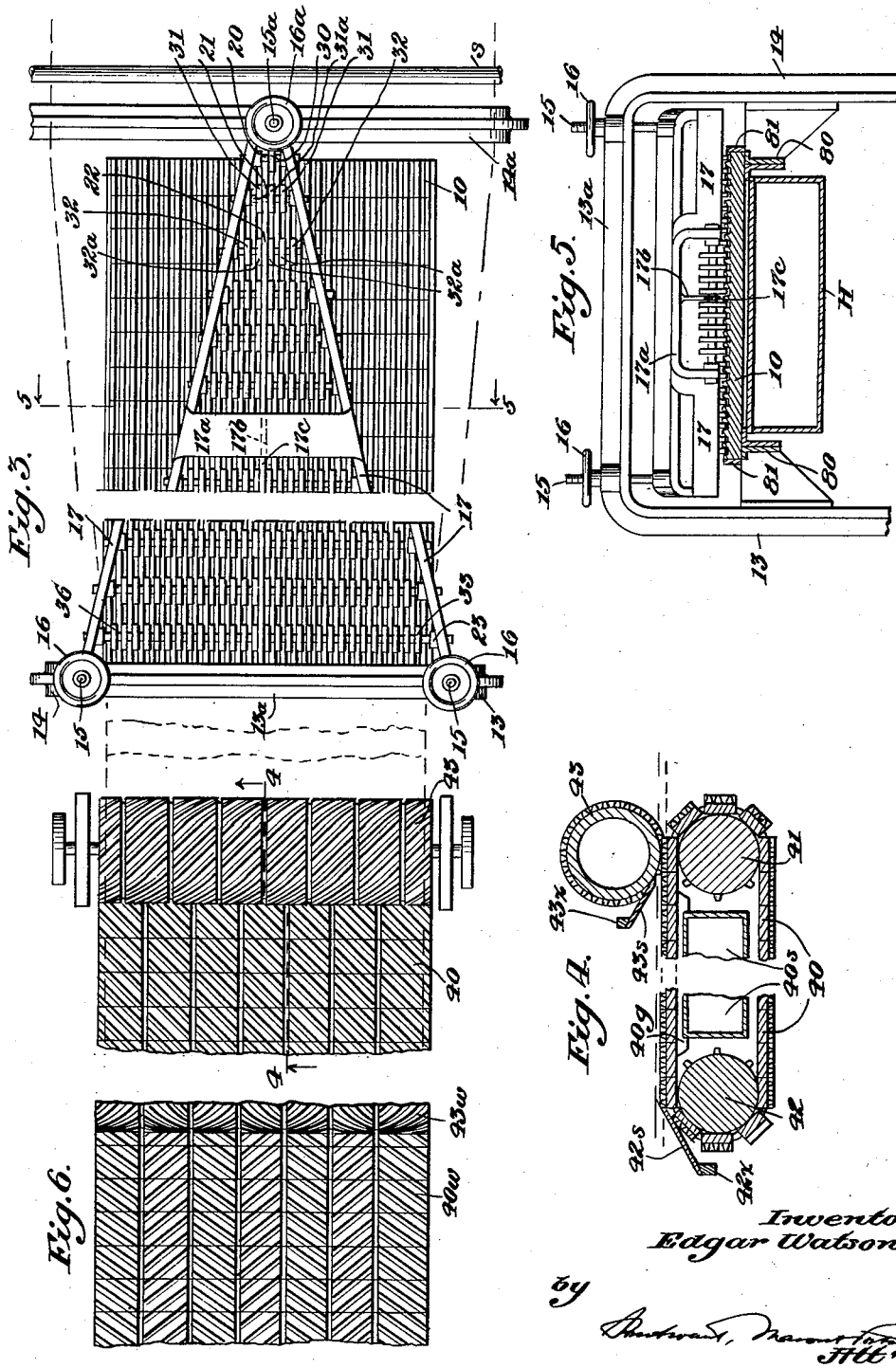

Patented May 26, 1936

2,042,243

UNITED STATES PATENT OFFICE 2,042,243

METHOD AND MACHINE FOR MAKING DIAGONALLY CORRUGATED BOARD

Edgar Watson, Towson, Md., assignor, by mesne assignments, to The Nelson Corporation, Baltimore, Md., a corporation of Maryland Application September 19, 1931, Serial No. 563,860

11 Claims. (Cl. 154—30)

This invention relates to improvements in a method of making a corrugated board, in which the corrugations extend diagonally to the boundary lines of the board, and to a machine operating according to such method.

For certain purposes, it is desirable to have sheets of corrugated papers in which the corrugations extend obliquely or diagonally with respect to the boundary edges of the sheet. It has heretofore been possible, commercially, to make these sheets only by cutting obliquely through and across a sheet formed in the usual way, in which the corrugations extend transversely of the sheet as manufactured.

One of the difficulties encountered in preparing a diagonally corrugated board is to avoid the necessity of accomplishing a lateral movement of portions of a sheet while they are in actual contact with the devices which are forming, in the sheet, the diagonal corrugations desired. It will be understood that in the normal manufacture of corrugated material, the filler sheet is passed through a pair of rollers having peripheral flutings parallel to the axis and meshing one with the other between the two rollers. This establishes the transverse corrugations which are then held in form by gluing one or more liner sheets onto the corrugated filler sheet. The corrugating rolls therefore decrease the effective length of the filler sheet in folding it to form the corrugations, but no decrease in the effective width of the sheet is accomplished or sought. When, however, diagonally corrugated sheets are to be prepared, it is necessary to accomplish a diminution in the width of the sheet as well as in its length. The actual amount of decrease is determined by the length of the sheet which produces a given length of corrugated material: and likewise a given width of filler sheet will produce a lesser width of the corrugated sheet. This decrease is determined by the shape of the corrugations, and by the angle of the lines of corrugations with respect to the edges of the sheet.

One of the objects of the present invention is to provide a way of producing diagonally corrugated material by initially decreasing the width of the sheet and thereafter forming the diagonal corrugations in the sheet when thus narrowed and at the same time reducing the sheet in the longitudinal direction.

A further object of the present invention is to provide a way of decreasing the width of the sheet successively from the center thereof whereby to avoid any stretching or tearing of the fibers of the paper during the operation of diagonal corrugation.

A further feature of the present invention is to provide a way of forming diagonal folds or corrugations in a sheet of material and then to maintain these folds during the operation of placing a liner sheet upon the corrugated filler sheet.

With these and other objects in view, as will appear in the course of the following specification and claims, two illustrative forms of practicing the invention are set forth in the accompanying drawings, in which Figure 1 is a diagrammatic vertical section through the machine, showing the passage of the webs and their formation into a corrugated board having two liners with a diagonally corrugated filler therebetween.

Figure 2 is a corresponding view showing the elements of the driving system.

Figure 3 is a plan view, on a larger scale, showing the contracting or narrowing portion of the machine and the re-forming or diagonally corrugating portions.

Figure 4 is a vertical sectional view substantially on the broken line 4—4 of Figure 3.

Figure 5 is a vertical sectional view on line 5—5 of Figure 3, showing the relationship of the narrowing belt and the longitudinal corrugating rollers.

Figure 6 is a view corresponding to the left hand or diagonal-corrugating belt portion of Figure 3, but showing a modified form of link belt upon which a herring-bone corrugated material may be formed.

Figure 7 is a diagrammatic view showing a preferred relationship of longitudinal and diagonal corrugations and illustrating the relative elevation and depression in reforming the longitudinal corrugations into diagonal corrugations.

Figure 8 is a similar view taken at a right angle to that of Figure 7, showing a conventional shape of the corrugations.

In these drawings, a roll F of straw board, for example, is employed as a source of supply of filler material. The rolls L$a$ and L$b$ similarly serve as sources for the top and bottom liner material. The filler material $f$ is brought from the roll F past the steam pipes $s$, which have apertures directed toward the web of material and project steam upon it whereby it is tempered and softened for the folding operations to be accomplished. The filler material $f$ is then brought over a traveling belt 10, which moves over the sprockets 11, 12, and is comprised of a plurality of links as shown in Figure 3, which are connected together in a chain and are all provided with corrugations extending in the direction of movement of the belt. As shown in Figure 5, the frame members 13, 14, are joined at the top by a cross rail 13a which receives the spindles of the height adjusting devices illustrated as comprising the bolts 15 and hand wheels 16. In Figure 3, the corresponding front frame member 14a has a bolt 15a and a hand wheel 16a. At the lower end of the bolts is secured a roller frame including the supporting bars 17, and a cross bar 17a. By adjusting the handle of the hand wheels 16, 16a, the vertical height of this roller frame may be regulated as desired. Mounted in the supporting bars 17, are a plurality of shafts 20, 21, 22 ... 23.

The first shaft 20 has a single roll 30 thereon which is positioned preferably at the center line of the filler sheet f, and operates as a forcing roll to push the filler web directly into the corresponding groove of the chain 10. The second shaft 21 has near the bars 17, 17, a pair of forcing rollers 31 which are separated from one another and operate to engage the sheet f closely adjacent the groove formed by the roller 30 and to push the sheet down into the two grooves at either side of the center groove in the chain 10; the second shaft 21 also has a retaining roller 31a located in alignment with the forcing roller 30. Similarly the shaft 22 is provided near the bars 17, 17 with two forcing rollers 32 which are offset outwardly from the rollers 31 and in turn serve to establish the next two longitudinal corrugations in the sheet: this shaft 22 also has the three retaining rollers 32a which are located in alignment with the rollers 31 and 31a.

The number of shafts preferably is calculated on the basis of the number of longitudinal corrugations to be provided in the maximum width of material. Thus, each shaft carries a pair of forcing rollers at its ends whereby each shaft forms two longitudinal corrugations, so that the number of shafts is approximately one-half the number of longitudinal corrugations to be formed. The last shaft 26 has, near the bars 17, 17, a pair of forcing rollers 36 which establish corrugations closely adjacent the edge of the sheet, and also a plurality of retaining rollers 36a spaced between them.

The cross web or member 17a joining the bars 17 is shown in Figure 5 as including a downwardly extending bracket 17b which serves as an intermediate support for a bar 17c which serves to stiffen the shafts and prevent springing.

It will be noted that each successive roller in cooperating with its corresponding groove, serves to narrow or decrease the width of the sheet f as the latter is distorted from a plane into the corrugated form, until the final sheet is corrugated longitudinally and is of a width corresponding to the final width to be given the diagonally corrugated material. Beneath the upper and lower runs of the belt 10 is provided a steam box or heating chest H for keeping the material at a suitable temperature during the narrowing operation. The sheet is held fixedly in the grooves of the chain 10 by the successive retaining rollers and is carried along therewith until the individual links drop away from beneath it.

After the sheet leaves the link belt 10, it is passed between the pipes m, m, which have fine orifices therein directed toward the sheet, so that a very fine spray of a lubricating material such as paraffin oil may be projected onto the sheet to assist the fibers in their later movement of rearrangement into the form required in the diagonally corrugated filler web. It is preferred to support the longitudinally corrugated sheet, after it leaves the link belt 10, by a belt 25, passing over the rollers 26.

The sheet is then forwarded in its longitudinally corrugated form onto a link belt 40 which likewise comprises a plurality of individual links (Figure 4) which are in close abutting relationship with one another and which are provided on their upper surfaces with diagonally extending grooves. This link belt passes over the end rollers 41, 42. Mounted above the rollers 41 is a helically fluted pressure roll 43, which engages the longitudinally corrugated sheet in the condition as it emerges from the rollers 33, and by re-forming the longitudinally corrugated sheet from point to point, transforms its longitudinal corrugations into diagonal ones, but without changing the width of the sheet. This helically fluted roll 43 is preferably hollow and provided with steam heating means.

During this operation, however, the length of the sheet is decreased by the necessary amount to provide the diagonal corrugations. The spirally fluted roller 43 forces the material downward into the grooves of the individual links of the belt 40 in which they are held by their own friction and by the stiffness of the corrugated sheet itself. Between the upper and lower runs of the link belt 40, is provided the steam heating chest 40s, and the belt guides 40g.

The helically fluted roll 43 is preferably provided from point to point (for example, every four inches with corrugations of the usual sizes) with peripheral grooves into which pass the stripper fingers 43s mounted on a bar 43x. Likewise longitudinal grooves are provided in the chain belt 40, in which rest the stripper fingers 42s carried by the transverse rail 42x.

The cement applying roll 53 is supplied with a suitable cement such as silicate of soda from the supply roll 54, which revolves in the silicate pan 55. The applying roll 53 preferably travels at the same peripheral speed as the speed of movement of the link belt 40 and hence of the corrugated material located on said belt and supplies the ribs of the corrugations with a thin layer of silicate.

The top liner l from the supply roll La is passed over guide roll 50 and the preheating roll 51 and then is passed over an applying roll 52 which presses it down against the upper surface of the diagonally corrugated sheet passing beneath it.

The diagonally corrugated board with the liner strip cemented thereto is now carried by the links of the belt 40 beneath a plurality of heating blocks 59, which, in cooperation with the steam chest 40s, dry the moisture from the cement and fasten the filler and liner together.

The blocks 59 are supported by a frame 59a and the cross members 59b.

The corrugated board now comprising the diagonally corrugated filler with the top liner cemented thereon is passed over the cement applying roll 64 which is supplied with a suitable cement from the supply roll 65 which revolves in the cement pan 66.

The bottom liner lb from the supply roll Lb passes over the guide roll 60 beneath the machine and over the preheating roll 61 and thence around an applying roll 62 and is brought into contact with the lower surface of the diagonally corrugated board. A counter-pressure roll 63 is mounted above the roll 62 to hold the top-lined diagonally corrugated sheet in position to receive the bottom liner. The sheet with its two liners now passes beneath the stationary block 67, which is provided with the rolls 68 on the lower surface thereof to hold the sheet in contact with the heating units 69 beneath the web, which dry the cement employed for the lower liner.

Finally, the sheet, now comprising the diagonally corrugated filler with two liners, the top and bottom liners, is passed between the delivery rolls 70, 71 and emerges as a sheet D which may be cut to any desired length.

As shown in Figure 2, it is preferred to connect the several chains and belts, driving rolls, etc., to a single driving motor E. In the form illustrated, the driving belt 100 of this motor drives a pulley 101, which is provided with the variable diameter pulley 102 for a belt 103 connecting with a second variable diameter pulley 104 mounted on the shaft 26a of a roll 26. The shaft 26a also is connected by a chain 28 with a sprocket on the shaft 12a of the sprocket 12: a further chain 29 establishes a driving relationship between the shaft 12a and the shaft 11a of the sprocket 11, so that a positive driving relationship is established for the narrowing belt.

The shaft 101a of pulley 101 also has a sprocket 105 over which passes the driven chain 106, which drives a sprocket on the shaft 41a of the sprocket 41 and sprockets on the shaft 51a, 52a of the preheating and applying rolls 51 and 52, as well as a sprocket 107 on the shaft 53a of the cement applying roll so that these various parts are driven in unison and at speeds determined by the relative diameters of these sprockets. A gear 108 on the shaft 51a meshes with a gear 109 on the shaft 50a of the guide roll 50. Similarly, a gear 110 connected to the cement supplying roll 54, is driven by a gear on the shaft 53a. The gear 111 in the shaft 41a is in mesh with the gear 112 on the shaft 43a of the helically fluted roll 43. The sprocket on the shaft 41a is also provided to drive a chain 113 which passes over a sprocket 114 on the shaft 42a of the roll 42, this latter shaft having also a further sprocket for the chain 115 which passes over a sprocket 116 of the shaft 61a of the preheating roll 61.

This chain 115 also drives a sprocket 117 on the shaft of the cement applying roll 64 and this latter shaft in turn drives the shaft 64a of the cement supply roll 65. A gear 118 on the shaft 61a meshes with a gear 119 on the shaft of the applying roll 62 and this latter gear 119 in turn with the gear 120 of the shaft on the counter pressure roll 63. A sprocket on the shaft 61a is also provided to drive a chain 121 which passes over the sprocket 122 of the delivery roll shaft 71a.

The shaft 71a has a gear 123 in mesh with the gear 124 of the upper delivery roll shaft 70a. In this way all parts are driven in unison from a single source of power. The variable diameter pulleys 102 and 104 are of the usual type whereby a variation in diameter of these pulleys will cause the shaft 26a to be driven at a speed which is a multiple of the speed of movement of the corresponding shaft 41a for the chain 40, whereby to compensate for the decrease in length of the web during the operation of forming the spiral corrugations therein. The variability of the drive permits exact compensation for this decrease in length.

As shown in Figure 4, the spirally fluted roller 43 enters the links of the chain 40 to a distance below their upper surfaces whereby to definitely press the filler sheet down into the grooves thereof. The successive links of the chain 40 preferably abut one against another so that there is no interval between them to cause an irregularity of the corrugation of the filler sheet. The links of the belts 10, 40 are likewise supported by the guides 80, 40g upon which they rest, and are held against movement at right angles to the direction of travel by the guide rails 81. They are connected together so that in passing around the sprockets 11, 12, 41, 42, they do not move upwardly above the top surface defined by the abutting links passing between these rollers, whereby to avoid a stretching or tearing of the paper located above them.

In the modified form of construction shown in Figure 6, the roll 43w is provided with herringbone corrugations in lieu of simple helical fluting, while the links of the link belt 40w are similarly provided with herring-bone grooves. These elements may be substituted for the corresponding elements 43 and 40 in the above described figures without further change and then herringbone corrugated material may be made. In some instances, the herring-bone corrugation has an an advantage over the simple diagonal corrugation, in that herring-bone board does not have a direction of weakness parallel to any corrugation line as is the case in the ordinary corrugated board or in the simple diagonally corrugated board.

While the invention has been described above as illustrating the manufacture of a double-lined board, it will be understood that by omitting the delivery of lining paper from the roll Lb, and lowering the cementing roll 64, it is possible to make a single-lined paper having a diagonally corrugated or herring-bone corrugated filler.

It will be noted that the "herring-bone" is a species of the "diagonal" filler and varies therefrom only in the fact that parts of the diagonals are displaced in direction instead of extending in straight lines, and that the corresponding roll is helically fluted, but the fluting varies in angle, being alternately to the right and to the left.

It is preferred that the same number of longitudinal corrugations should be formed in the narrowing portion of the machine, along any transverse line of the sheet, as there are to be diagonal corrugations produced in the diagonally corrugated portion of the machine along any transverse line of the diagonally corrugated sheet.

This is illustrated in Figure 7, in which the ribs 100 of the longitudinal corrugations correspond in number to the ribs 101 of the diagonally corrugated portion of the sheet. It will be noted that in effect, the action of the helical roll and diagonally grooved link belt 40 is to cause a depression of the longitudinal grooves corresponding to the points marked with a star in this figure, and an elevation of the points marked each with a circle, while substantially the points marked with the small triangle are left unchanged as to elevation or depression. Intermediate points are more or less depressed to produce the proper conformation in the diagonally corrugated material.

It is obvious that the invention is not limited solely to the forms and execution shown, but that many modifications may be made therein without departing from the scope of the following claims.

What is claimed:

1. The method of making a diagonally corrugated sheet material, which comprises narrowing a sheet by forming a plurality of corrugations therein, and thereafter re-forming the sheet by alternately sustaining and depressing each said corrugation at successive points along its length whereby to produce a diagonally corrugated sheet material having an equal number of corrugations on any transverse line to the number of corrugations on any transverse line in said narrowed sheet.

2. The method of making a diagonally corrugated sheet material from a continuous web, which comprises narrowing the web by forming therein a plurality of longitudinal corrugations, spraying a lubricant upon the faces of the web, and thereafter re-forming the web by depressing and elevating portions of said longitudinal corrugations whereby to produce a like number of corrugations along any transverse line of the web which extend diagonally to the edges of the web.

3. A machine for making diagonally corrugated sheet material, comprising a mechanism to form corrugations in the sheet parallel to an edge thereof, oppositely disposed intermeshing members having alternate ribs and grooves extending diagonally to said edges of the sheet to re-form the first-formed corrugations, one of said members comprising a link belt for engaging and supporting the re-formed sheet, and means for feeding and cementing a liner to said re-formed sheet while the latter is in said link belt.

4. A machine for making diagonally corrugated sheet material, comprising a mechanism to form corrugations in the sheet parallel to an edge thereof, a link belt comprising a plurality of links having aligned diagonally extending alternate ribs and grooves, and a helically fluted roll intermeshing with said links.

5. In a machine for making diagonally corrugated sheet material, the combination of a link belt comprising a plurality of links having aligned diagonally extending alternate ribs and grooves, and a helically fluted roll intermeshing with said links.

6. In a machine for making diagonally corrugated sheet material from a web, the combination of a link belt comprising a plurality of links having aligned diagonally extending alternate ribs and grooves, said links also having longitudinal grooves extending in the direction of movement of the links, stripper means located in said longitudinal grooves to separate the web from the links, a helically fluted roll intermeshing with said links, said roll having peripheral grooves, and stripper means located in said peripheral grooves to separate the web from the roll.

7. A machine for making diagonally corrugated sheet material from a web, comprising a mechanism to form corrugations in the sheet parallel to an edge thereof whereby to narrow the sheet, a mechanism for re-forming the corrugated web from point to point whereby to transform the longitudinal into diagonal corrugations and therewith alter the web, a single source of driving power, and transmission means from said source to said narrowing and diagonally corrugating mechanisms, the speed ratio of drive to said diagonal corrugating mechanism being less than that to said narrowing mechanism whereby to compensate for the decrease in length of the web by the operation of said diagonally corrugating mechanism.

8. A machine as in claim 7, in which means are provided for varying the speed of movement of one said mechanism independently of the speed of movement of the other mechanism.

9. A machine for making diagonally corrugated sheet material for a web, comprising a mechanism to form longitudinal corrugations in the sheet parallel to an edge thereof, a mechanism for re-forming the longitudinally formed corrugations from point to point whereby to transform them into diagonal corrugations, and means located between said mechanisms for projecting a lubricant onto the faces of said sheet prior to its entry into said re-forming mechanism.

10. A machine for forming corrugations in sheet material, comprising a link belt provided with a plurality of links having diagonally thereon alternate ribs and grooves, and a fluted roll intermeshing with the ribs and grooves of said links and having its axis at a right angle to the direction of said link belt.

11. A machine for making herring-bone corrugated sheet material comprising a mechanism to form corrugations in a sheet parallel to the edge thereof, a link belt comprising a plurality of links having aligned diagonally extending alternate ribs and grooves arranged in herring-bone pattern, and a roll intermeshing with said links and having helical flutes in herring-bone pattern.

EDGAR WATSON.